United States Patent
Hasegawa et al.

[11] Patent Number: 5,454,861
[45] Date of Patent: Oct. 3, 1995

[54] COMPOSITION FOR FORMING PROTECTIVE LAYER OF DIELECTRIC MATERIAL

[75] Inventors: Hiromi Hasegawa; Kenichi Suzuki, both of Niigata, Japan

[73] Assignee: Hokuriko Toryo Kabushiki Kaisha, Niigata, Japan

[21] Appl. No.: 234,734

[22] Filed: Apr. 28, 1994

[30] Foreign Application Priority Data

May 7, 1993 [JP] Japan .................................. 5-106491

[51] Int. Cl.$^6$ ..................................... C09D 7/12
[52] U.S. Cl. ..................... 106/2; 106/287.1; 106/287.16; 106/287.17; 106/287.19; 252/62.3 BT; 252/62.3 R
[58] Field of Search ............... 106/287.1, 287.16, 106/287.17, 287.19, 2, 68; 252/62.3 BT, 62.3 R

[56] References Cited

U.S. PATENT DOCUMENTS

| | | | |
|---|---|---|---|
| 3,730,743 | 5/1973 | McLeod | 106/287.16 |
| 4,229,228 | 10/1980 | Rotenberg et al. | 106/287.16 |
| 4,746,366 | 5/1988 | Philippi et al. | 106/287.19 |

FOREIGN PATENT DOCUMENTS 12702  8/1993  Japan .

Primary Examiner—Mark L. Bell
Assistant Examiner—C. M. Bonner
Attorney, Agent, or Firm—Jordan and Hamburg

[57] ABSTRACT

There is disclosed a composition for forming a protective layer of a dielectric material which comprises:
(A) alkaline earth metal oxide particles; and
(B) one or more organic compounds containing a metal element and represented by the formula (I):

$$M^1(OR^1)_n \qquad (I)$$

wherein $M^1$ represents Al, Si, Ti or Zr; $R^1$ represents $C_{2-8}$ alkyl group or $C_{2-8}$ alkoxyalkyl group, provided that when $M^1$ is Al, Ti or Zr, $OR^1$ may be alkylacetoacetato or acetylacetonato, or when $M^1$ is Zr, $R^1$ may be a monovalent acyl group which may be substituted by an hydroxyl group; and n represents the valency of $M^1$, or a partially hydrolyzed or co-hydrolyzed condensate thereof.

26 Claims, 1 Drawing Sheet

COMPOSITION FOR FORMING PROTECTIVE LAYER OF DIELECTRIC MATERIAL

BACKGROUND OF THE INVENTION

The present invention relates to a composition for forming a protective layer of a dielectric material which is suitable for forming a dielectric material-protective layer containing an alkaline earth metal oxide, more specifically it relates to a composition for forming a protective layer of a dielectric material which comprises alkaline earth metal oxide particles and, as a binder precursor, an organic compound containing a specific metal in a molecule thereof, which provides an excellent protective effect.

In a display device using electron rays such as a vacuum fluorescent display (VFD) and a gas discharge panel (or a plasma display panel), a coating layer comprising an alkaline earth metal oxide which is formed on the surface of a dielectric material has conventionally been used as a dielectric material-protective layer. Particularly in a gas discharge panel, an electrode for discharge is covered with a dielectric material such as a glass, for example, a lead borosilicate glass, and therefore, if discharge is carried out on the surface of the dielectric material, it causes damage to the dielectric material, due to corona discharging. Accordingly, a protective layer has been provided on the surface of the dielectric material. Magnesium oxide and others are used as the protective layer of such a dielectric material, and a vacuum evaporation coating method is employed for formation of the protective layer.

However, if a gas discharge panel having a large picture such as a High-Definition television (HDTV) set is produced by the vacuum evaporation coating method, a large sized vacuum evaporation coating device accompanied by a large scale apparatus for maintaining the vacuum is required, which is not practical for industrial purposes.

For the above reasons, it has been tried to form a protective layer on the surface of the dielectric material by printing and firing. For example, Uchiike et al. prepared a sample of AC plasma display by a thick film technique using a paste containing magnesium oxide powder or magnesium hydroxide powder and evaluated it (refer to Material 4-3 of the Annual Meeting of the Television Association, p 71 (1991); and Material 5-1 of the Annual Meeting of the Television Association, p 101 (1992)), but failed to provide sufficient functions.

As an uneven thickness of such a dielectric material-protective layer causes an uneven emission, a protective layer having a homogeneous film thickness is required. Also, if the layer has pinholes or cracks, lead or other material can precipitate from the glass which is used as the dielectric material. Accordingly, the protective layer must not have such defects.

The present inventors obtained a dielectric material-protective layer which has a homogeneous film thickness without defects by coating a surface of a dielectric material with an alkoxide or an organic acid salt which contains an alkaline earth metal such as magnesium in a molecule thereof and firing the same (Japanese Patent Application No. 308525/1992). The present inventors also obtained a dielectric material-protective layer which has a homogeneous film thickness without defects by using a coating composition in which alkaline earth metal oxide particles are combined with the similar organic compound as mentioned above as a binder precursor (Japanese Patent Application No. 12702/1993). These dielectric material protective layers each have the advantage that they are excellent in sputtering-resistance and can be formed without heating at high temperatures or without using a large sized apparatus. However, the alkaline earth metal-containing organic compound to be used is easily hydrolyzed so that attentions should be paid when using it, depending on the purposes. For the above reason, a dielectric material-protective layer employing a binder precursor which can be easily handled has been desired.

SUMMARY OF THE INVENTION

It is an object of the present invention to provide a composition for forming a protective layer of a dielectric material which can easily and efficiently give a dielectric material-protective layer which has a homogeneous film thickness, has no defects, is excellent in sputtering-resistance, and shows an excellent protective effect for a dielectric material under exposure to electron rays. The present inventors made various studies in order to solve the above problems and have found that an organic compound such as an alkoxide containing a metal of Al, Si, Ti or Zi is less hydrolyzed as compared with an alkaline earth metal-containing organic compound, can easily be handled as a binder precursor, and has a high efficiency for forming a film, and further, that the sputtering-resistance of a metal oxide binder phase which is obtained by firing of the film is comparable to that of the alkaline earth metal oxide to accomplish the present invention.

That is, the present invention relates to a composition for forming a protective layer for a dielectric material which comprises:

(A) alkaline earth metal oxide particles; and
(B) one or more organic compounds containing aluminum (Al), silicon (Si), titanium (Ti) or zirconium (Zr) and represented by the following formula (I):

$$M^1(OR^1)_n \qquad (I)$$

wherein $M^1$ represents Al, Si, Ti or Zr; $R^1$ represents an alkyl group having 2 to 8 carbon atoms or an alkoxyalkyl group having 2 to 8 carbon atoms, a plural number of $R^1$'s may be the same or different from each other, provided that when $M^1$ is Al, Ti or Zr, $OR^1$ may be an alkylacetoacetato group or an acetylacetonato group, or when $M^1$ is Zr, $R^1$ may be a monovalent acyl group which may be substituted by an hydroxyl group; and n represents the valency of $M^1$,
or a partially hydrolyzed or co-hydrolyzed condensate of the compound, as a binder precursor.

As a preferred embodiment of the present invention, as Component (B), one or more kinds of organic compounds containing an alkaline earth metal represented by the formula (II) or (III):

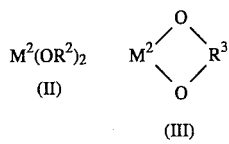

wherein $M^2$ represents an alkaline earth metal atom; $R^2$ may be the same or different from each other and represents a monovalent hydrocarbon group or a monovalent acyl group which may be substituted by a hydroxyl group; and $R^3$ represents a divalent acyl group which may be substituted by a hydroxyl group, may be used in combination with the organic compound of the formula (I).

DESCRIPTION OF THE PREFERRED EMBODIMENTS

Figure 1:
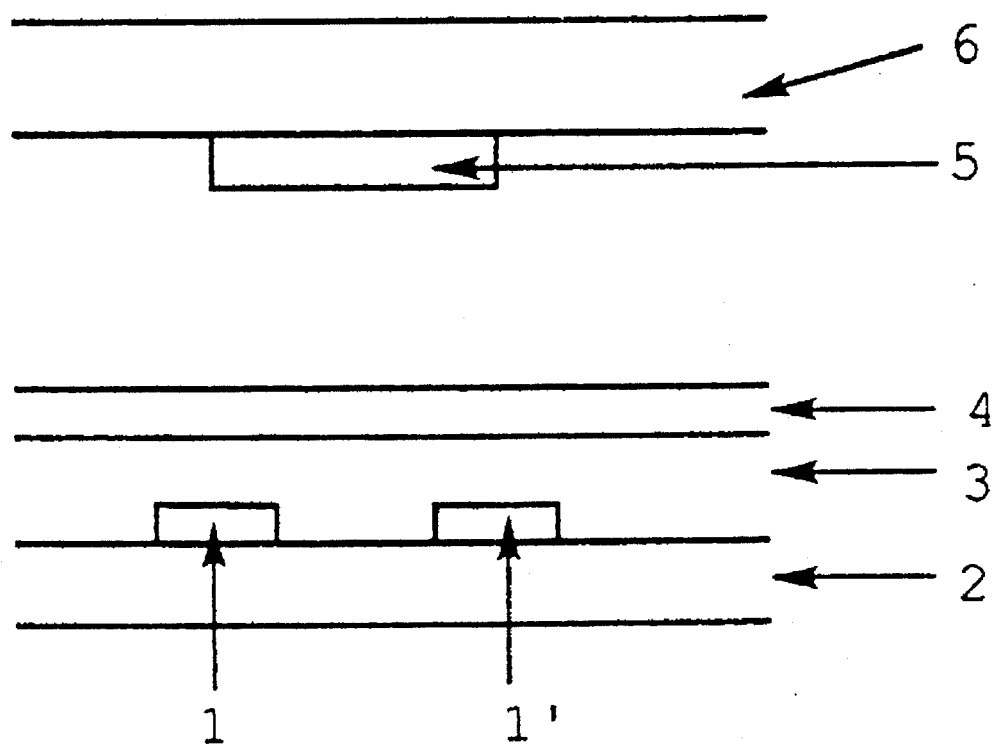
FIG. 1 is a sectional view of a gas discharge panel which is used in a continuous discharge test, wherein the reference numerals 1 and 1' are each an electrode; 2 is a back surface glass; 3 is a dielectric material layer; 4 is a protective layer for the dielectric material; 5 is a phosphor layer; and 6 is a front surface glass.

In the following, the present invention is explained in detail.

As (A) the alkaline earth metal oxide particles to be used in the present invention, there may be exemplified beryllium oxide, magnesium oxide, calcium oxide, strontium oxide and barium oxide; and a composite oxide thereof such as (Ba.Sr)O and (Ba.Ca.Sr)O. Two or more kinds thereof may be used in combination. The kind and the particle size may be selected depending on the purposes. Magnesium oxide which is excellent in sputtering-resistance and has a high secondary electron-releasing ratio and a high stability is preferred. The particle size is preferably 0.1 to 10 μm.

The component (B) to be used in the present invention is a binder precursor comprising (1) the organic compound containing the above-mentioned metal element or a partially (co)-hydrolyzed condensate thereof, or a binder precursor comprising not only (1) but also (2) an organic compound containing an alkaline earth metal element, wherein a continuous phase of the binder comprising oxides of the metal elements contained in the used (1) and (2) is formed by firing at (A) the alkaline earth metal oxide particles. By using (2) together with (1), the sputtering-resistance and the secondary electron-releasing ratio of the binder and the hydrolysis-resistance of the binder precursor can be well and highly balanced.

The component (1) is an organic compound containing a specific metal element and represented by the following formula:

$$M^1(OR^1)_n \qquad (I)$$

wherein $M^1$, $R^1$ and n have the same meanings as above, or a compound which is obtained by partially hydrolyzing the organic compound and condensing the same or by partially co-hydrolyzing two or more kinds of the organic compounds and condensing the same. $R^1$ is selected from the following three groups, and may be the same or different from each other:

(i) an alkyl group having 2 to 8 carbon atoms or an alkoxyalkyl group having 2 to 8 carbon atoms;

(ii) an alkylacetoacetato or acetylacetonato group as $OR^1$ provided that $M^1$ is Al, Ti or Zr; and (iii) a monovalent acyl group which may be substituted by a hydroxyl group provided that $M^1$ is Zr. Among the metal element-containing organic compound $M^1(OR^1)_n$ which has the above-described $R^1$ group, a compound which has a low volatility even at high temperatures, such as a compound wherein $R^1$ is (ii) or (iii) as mentioned above or a compound wherein (i) and (ii) as mentioned above coexist as $R^1$, may be used as a binder precursor as such. In the case of a compound which has volatility at an ordinary temperature or high temperatures such as a compound wherein $R^1$ is (i), in order to prevent the compound from volatilizing before formation of the metal oxide by firing, it is preferred to use a partially hydrolyzed condensate of said organic compound containing the metal element or a condensate obtained by partially co-hydrolyzing two or more organic compounds containing the metal element and condensing the hydrolyzed compounds. The number of $M^1$ atoms in the condensate is preferably in the range of 3 to 15 in average. If the number of $M^1$ atoms is less than 3, the condensate is still easily hydrolyzed and a large amount of the organic compound containing the metal element is volatilized at the time of firing. If the number of $M^1$ atoms exceeds 15, a homogeneous film can be hardly obtained.

$M^1$ may be the same or different from each other and is selected from Al, Si, Ti and Zr. Two or more kinds may be used in combination. Al or Ti is preferred since it provides a binder phase excellent in sputtering ability.

When $R^1$ is (i), said $R^1$ may be straight or branched, and the alkyl group may include ethyl, propyl, butyl, pentyl, hexyl, heptyl and octyl; and the alkoxyalkyl group may include methoxyethyl, ethoxyethyl and butoxyethyl. When $R^1$ is methyl, the organic compound containing the metal element or the condensate thereof is easily hydrolyzed so that a paste for forming an anode containing the precursor cannot stably be preserved and is difficult to handle. If $R^1$ is an alkyl or alkoxyalkyl group having 8 or more carbon atoms, the yield of the oxide per weight of the precursor is low so that it is not advantageous.

When $R^1$ is (ii), the $OR^1$ containing said $R^1$ may include an alkylacetoacetato group and/or an acetylacetonato group; the alkyl group of the former may include methyl, ethyl and propyl. In such a case, the oxygen atom of the carbonyl group of $R^1$ is coordinated with $M^1$ to form a chelate ring together with the central element $M^1$, as shown in the formula (IV) below. Two kinds of $R^1$'s classified in (i) and (ii), respectively, may be included in one compound containing the metal element. In such a case, n represents the total number of the alkoxy group(s), the alkoxyalkoxy group(s) and the ethylacetoacetato group(s) each bonding to $M^1$.

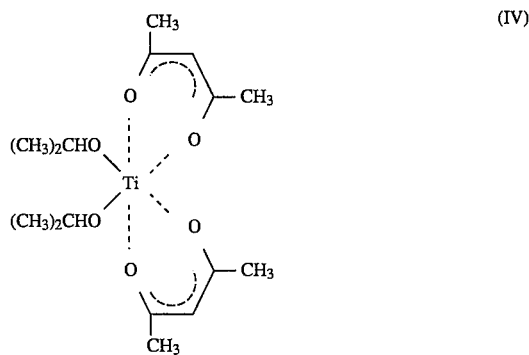

(IV)

When $R^1$ is (iii), said $R^1$ may include a saturated aliphatic acyl group such as formyl, acetyl, propionyl, butyryl, valeryl, hexanoyl, octanoyl, decanoyl, dodecanoyl and stearoyl; an unsaturated aliphatic acyl group such as acryloyl, methacryloyl, sorbinoyl and oleoyl; an alicyclic acyl group such as cyclopentanoyl and cyclopentylethanoyl; an aromatic acyl group such as benzoyl, toluoyl, ethylbenzoyl, propylbenzoyl, butylbenzoyl and phenylethanoyl; and an oxy acid residue such as α-oxypropanoyl.

Among various $R^1$'s, an alkyl group such as ethyl, propyl, butyl and octyl; and an alkoxyalkyl group such as methoxyethyl are preferred. As $OR^1$, a chelate ring-forming group such as ethylacetoacetato and acetylacetonato; and an acyl group such as hexanoyl and octanoyl are preferred.

As a representative example of the organic compound containing the metal element, a compound having $R^1$ which is (i) may include titanium tetraethoxide, titanium tetra-n-propoxide, titanium tetraisopropoxide, titanium tetra-n-butoxide, titanium tetra-sec-butoxide, titanium tetra-tert-butoxide, titanium tetrakis (hexyloxide), titanium tetrakis(2-ethylhexyloxide), titanium tetrakis(methoxyethoxide), titanium tetrakis (ethoxyethoxide) and titanium tetrakis(butoxyethoxide); the corresponding aluminium trialkoxide, aluminium tris(alkoxyalkoxide), tetraalkoxysilane, tetrakis-(alkoxyalkoxy)silane, zirconium tetraalkoxide and zirconium tetrakis(alkoxyalkoxide); and a partially (co-hydrolyzed condensate thereof.

As a compound having $R^1$ which is (ii) or a compound having $R^1$'s in which (i) and (ii) coexist, there may include diisopropoxytitanium bis(methylacetoacetate), diisopropoxytitanium bis(ethylacetoacetate), dibutoxytitanium bis-(ethylacetoacetate) and diisopropoxytitanium bis(acetylacetonate); those corresponding thereto such as dialkoxyaluminium(alkylacetoacetate), alkoxyaluminium bis(alkylacetoacetate), aluminium tris(alkylacetoacetate), acetylacetonatoaluminium bis(alkylacetoacetate) and aluminium tris(acetylacetonate); and those corresponding thereto such as zirconium tetrakis(alkylacetoacetate), zirconium tetrakis(acetylacetonate) and so on.

A compound having $R^1$ which is (iii) may include a zirconium salt of an organic acid such as zirconium acetate, zirconium propionate, zirconium butyrate, zirconium caproate, zirconium caprylate, zirconium 2-ethylhexanoate, zirconium naphthenate, zirconium benzoate, zirconium lactate and so Among the organic compound containing the metal element $M^1(OR^1)_n$, preferably used are a titanium compound such as titanium tetraisopropoxide, titanium tetra-n-butoxide, titanium tetrakis(2-ethylhexyloxide), titanium tetrakis-(methoxyethoxide), diisopropoxytitanium bis(acetylacetonate) and so on; an aluminium compound such as aluminium triisopropoxide, diisopropoxyaluminium(ethylacetoacetate), aluminium tris(ethylacetoacetate) and so on; a silicon compound such as ethyl orthosilicate, propyl orthosilicate, (2-methoxyethyl) orthosilicate and so on; and a partially (co-)hydrolyzed condensate thereof; and a zirconium compound such as zirconium tetra-n-butoxide, zirconium caprylate, zirconium 2-ethylhexanoate and so on.

The partial (co-)hydrolysis and condensation of the organic compound containing the metal element: $M^1(OR^1)_n$ can be completed to the condensation reaction by adding a calculated amount of water to one or more kinds of said compounds while stirring, and if necessary, in the presence of a solvent such as toluene, to partially (co-)hydrolyze the compound at an ordinary temperature, or under heating or cooling, depending on the hydrolyric property of said compound, wherein the calculated amount means an amount of water obtained by reducing the amount of water formed by condensation from the theoretical amount of water required for partial (co-)hydrolysis.

The component (2) of the organic compound containing the alkaline earth metal is represented by the above-mentioned formula (II) or (III). $M^2$ which is an alkaline earth metal atom may be the same or different from the alkaline earth metal element of the above-mentioned (A) alkaline earth metal oxide particles. But it is preferred to use the same alkaline earth metal element or the same combination of the alkaline metal elements as in the alkaline earth metal oxide particles in many cases. As the alkaline earth metal, there may be exemplified beryllium, magnesium, calcium, strontium and barium, and it may be used singly or two or more kinds thereof may be used in combination. Magnesium is preferred as $M^2$ since it provides a protective layer of magnesium oxide which is excellent in sputtering-resistance and has a high secondary electron-releasing ratio and a high stability.

Two $OR^2$'s which are bound to the alkaline earth metal atom $M^2$ of the formula (II) may be the same or different from each other. $R^2$ is a monovalent hydrocarbon group or a monovalent acyl group which may be substituted by a hydroxyl group, and the carbon chain thereof may be straight or branched and may form a ring partially or as a whole. As the monovalent hydrocarbon group, there may be exemplified an alkyl group having 1 to 12 carbon atoms such as methyl, ethyl, propyl, butyl, pentyl, hexyl, heptyl, octyl, decyl, dodecyl and so on; a cycloalkyl group having 3 to 6 carbon atoms such as cyclopentyl, cyclohexyl and so on; and an aryl group such as phenyl. As the monovalent acyl group and the monovalent acyl group which is substituted by a hydroxyl group, there may be exemplified a saturated aliphatic acyl group having 1 to 18 carbon atoms such as formyl, acetyl, propionyl, butyryl, valeryl, hexanoyl, octanoyl, decanoyl, dodecanoyl, stearoyl and so on; an unsaturated aliphatic acyl group having 1 to 12 carbon atoms such as acryloyl, methacryloyl, sorbinoyl, oleoyl and so on; an alicyclic acyl group having 3 to 10 carbon atoms such as cyclopentanoyl, cyclopentylethanoyl and so on; an aromatic acyl group having 7 to 18 carbon atoms such as benzoyl, toluoyl, ethylbenzoyl, propylbenzoyl, butylbenzoyl, phenylethanoyl and so on; and an oxy acid residue such as α-hydroxypropanoyl; and so on.

In the formula (III), $R^3$ is a divalent acyl group which may be substituted by a hydroxyl group, and there may be exemplified as $R^3$, oxalyl, malonyl, succinyl, adipoyl, hydroxysuccinyl and so on.

Among these $R^2$ and $R^3$, preferred are an alkyl group having 1 to 6 carbon atoms, an aliphatic acyl group having 2 to 12 carbon atoms and an aromatic acyl group having 7 to 12 carbon atoms since these compounds can easily be synthesized and a homogeneous and defect-free protective layer for a dielectric material can be obtained. More preferred are methyl, ethyl, propyl, butyl and so on as the alkyl group; and heptanoyl, octanoyl, benzoyl, butylbenzoyl and so on as the acyl group.

As a representative example of the organic compound containing an alkaline earth metal, there may be mentioned a magnesium alkoxide such as magnesium dimethoxide, magnesium diethoxide, magnesium diisopropoxide, magnesium dibutoxide and so on; a magnesium salt of an organic acid such as magnesium formate, magnesium acetate, magnesium propionate, magnesium butyrate, magnesium caproate, magnesium caprylate, magnesium 2-ethylhexanoate, magnesium laurate, magnesium stearate, magnesium methacrylate, magnesium oleate, magnesium naphthenate, magnesium benzoate, magnesium p-butyl benzoate, magnesium lactate, magnesium adipate and so on; and the corresponding beryllium compounds, calcium compounds, strontium compounds and barium compounds. Preferred are the magnesium compounds, and particularly preferred are magnesium ethoxide, magnesium isopropoxide, magnesium caprylate and magnesium 2-ethylhexanoate.

The organic compound containing an alkaline earth metal can be obtained, for example, in the case of a metal alkoxide, by heating said metal or a hydroxide thereof together with an alcohol at high temperatures and is preserved under moisture-free conditions. The alkaline earth metal salt of an organic acid is obtained by reacting an oxide or a hydroxide of said metal with an organic acid. The above reaction may be carried out in the presence of a solvent or a dispersion medium to be used when coating as described below to have a solution or a dispersion of the organic compound containing said metal.

A formulation ratio of (2) the organic compound containing an alkaline earth metal in (B) the binder precursor is usually 50% by weight or less as the weight ratio of said precursor, and preferably 1 to 50% by weight. It is more preferred in the range of 10 to 30% by weight in view of the balance between the hydrolysis-resistance of the binder precursor and the sputtering-resistance and the secondary electron-releasing ratio of the resulting binder. If the formulation ratio of (2) exceeds 50% by weight, the hydrolysis-resistance is decreased so that it becomes difficult to handle the resulting composition for forming a protective layer of a dielectric material. Therefore, such an amount may not be suitable depending on the purposes.

The composition for forming a protective layer of a dielectric material of the present invention may be prepared by mixing (A) the alkaline earth metal oxide particles and (B) the binder precursor by a usual method. If (B) is easily hydrolyzed, a means of using dry nitrogen may be employed so as to avoid the effects of moisture in the air. The formulation ratio of (A) and (B) is not particularly limited. The formulation ratio varies depending on the purposes of said composition for forming a protective layer and is preferably in the range of 50:50 to 99.5:0.5, particularly preferably in the range of 70:30 to 99:1 in terms of the weight ratio of (A):(B') wherein the amount of (B) is calculated in terms of the weight of the metal oxide (B') of the binder phase formed by firing of (B). If necessary, the composition for forming a protective layer may be prepared in the presence of a solvent or at least one of a dispersion medium and/or an additive as described below.

By mixing the composition for forming a protective layer of a dielectric material of the present invention with a solvent or a dispersion medium if necessary, the organic compound containing a metal in the composition is dissolved or dispersed, and further the alkaline earth metal particles are dispersed therein. Then the mixture is applied onto the surface of a dielectric material by coating. As the dielectric material, a glass such as a lead borosilicate glass, a glass which is obtained by firing glass particles at a temperature of 500° to 600° C. and so on may be used.

As the solvent or the dispersion medium, it varies depending on the kind of the organic groups $R^1$ to $R^3$ of the organic compound containing a metal to be used as (B), but there may be exemplified an aromatic hydrocarbon such as toluene, xylene, ethylbenzene, diethylbenzene, isopropylbenzene, amylbenzene, p-cymene, tetralin and a mixture of petroleum aromatic hydrocarbons; an ether alcohol such as 2-ethoxyethanol, 2-butoxyethanol, diethylene glycol monoethyl ether and diethylene glycol monobutyl ether; a terpene alcohol such as menthol, terpineol, carveol, borneol and menthane diol; a ketone such as methyl isobutyl ketone; and an ester such as ethylene glycol monomethyl ether acetate. These solvents may be used singly or in combinations of two or more kinds thereof. If necessary, the solvent or dispersion medium is dehydrated before use, depending on the kind of the above binder precursor.

The viscosity of the system or composition is preferably 10 dPa·s or less when the coating is carried out by using a method of spraying, immersion or brush coating, 500 dPa·s or less when the coating is carried out by using a method of a roll or a doctor blade, and in the range of 50 to 1,000 dPa·s when a printing method is used. If necessary, a thickener such as ethylcellulose, nitrocellulose and an acryl resin may be used in combination so as to have a solution or a dispersion having a viscosity suitable for coating. A leveling agent or an anti-foaming agent may be added.

A protective layer comprising a continuous phase of the alkaline earth metal oxide particles and the metal oxide binder is formed on the surface of a base material by coating the composition for forming a protective layer of a dielectric material on the dielectric material and converting the binder precursor to the metal oxide by firing. Namely, the firing is carried out at 300° to 700 ° C., preferably at 400° to 600° C. for 5 to 30 minutes in the air to form the protective layer of a dielectric material having a thickness of 0.05 to 30 μm, preferably 1 to 15 μm, more preferably 2 to 8 μm on the surface of the dielectric material.

By using the composition for forming a protective layer of a dielectric material of the present invention, a protective layer of a dielectric material which is comparable to a protective layer of a dielectric material prepared by a conventional vacuum evaporation method, and is homogeneous, defect-free without pinholes nor cracks and excellent in sputtering-resistance, can more easily and more efficiently be prepared with a simpler apparatus and a simpler method than in a conventional method. Accordingly, a gas discharge panel having a large picture can be manufactured without using a large sized expensive apparatus.

EXAMPLES

The present invention is described in detail by referring to Examples and Comparative examples, but the invention is not limited by these Examples. In Examples and Comparative examples, all parts represent parts by weight.

In the following Examples, organic compounds containing a metal or partially hydrolyzed condensates thereof A to E as shown in Table 1 were used as the binder precursors of the present invention.

TABLE 1

| Binder precursor | Organic compound containing metal | |
|---|---|---|
| | Monomer*[1] | Average number of the metal atoms |
| A | Ti(O.n-Bu)$_4$ | 7 |
| B | Zr(O.n-Bu)$_4$ | 4.3 |
| C | Al(C$_6$H$_9$O$_3$)$_3$ | 1 |
| D | Si(OEt)$_4$ | 4.5 |
| E | Mg(OEt)$_2$ | 1 |
| F | Al(C$_6$H$_9$O$_3$) (O.i-Pr)$_2$ | 1 |
| G | Zr(O.n-Bu)$_4$/Si(OEt)$_4$*[2] | 5 |

(Remarks)
*[1]Et: an ethyl group; i-Pr: an isopropyl group; n-Bu: a n-butyl group; C$_6$H$_9$O$_3$: an ethylaceto-acetate group.
*[2]Ratio of metal (Zr:Si) = 1:1.

EXAMPLES 1 to 14

Alkaline earth metal oxide particles, a binder precursor as shown in Table 1, a thickener and a solvent in the formulation ratio as shown in Table 2 were mixed in an automortar to prepare respective pastes mainly comprising a composition for forming a protective layer of a dielectric material. The prepared pastes had a viscosity of 200 to 1,000 dPa·s. These pastes were each subjected to screen-printing on one surface of a slide glass having a thickness of 1 mm, dried at 150° C. for 10 minutes and sintered at 550° C. for 10 minutes to form a protective layer comprising the alkaline earth metal oxide particles and the metal oxide binder phase. In each Example, a homogeneous protective layer without fogs, cracks or pinholes can be obtained.

TABLE 2

| Example | Metal oxide particles | | | Binder precursor | | Thickener | | Solvent | |
|---|---|---|---|---|---|---|---|---|---|
| | Kind | Particle size (μm) | Amount (parts) | Kind | Amount (parts) | Kind*[1] | Amount (parts) | Kind*[2] | Amount (parts) |
| 1 | MgO | 5 | 100 | A | 50 | EC | 25 | $C_{10}H_{17}OH$ | 230 |
| 2 | MgO | 5 | 100 | B | 50 | EC | 25 | $C_{10}H_{17}OH$ | 230 |
| 3 | MgO | 5 | 100 | C | 70 | EC | 27 | $C_{10}H_{17}OH$ | 210 |
| 4 | MgO | 5 | 100 | D | 100 | EC | 30 | $C_{10}H_{17}OH$ | 180 |
| 5 | MgO | 5 | 100 | E | 10 | EC | 25 | $C_{10}H_{17}OH$ | 230 |
| | | | | C | 40 | | | | |
| 6 | MgO | 5 | 100 | E | 10 | EC | 27 | $C_{10}H_{17}OH$ | 220 |
| | | | | D | 50 | | | | |
| 7 | MgO | 5 | 50 | C | 70 | EC | 27 | $C_{10}H_{17}OH$ | 210 |
| | CaO | 3 | 50 | | | | | | |
| 8 | MgO | 5 | 50 | E | 10 | EC | 25 | $C_{10}H_{17}OH$ | 230 |
| | CaO | 3 | 50 | C | 40 | | | | |
| 9 | MgO | 5 | 50 | C | 70 | EC | 27 | $C_{10}H_{17}OH$ | 210 |
| | CaO | 3 | 40 | | | | | | |
| | BaO | 5 | 10 | | | | | | |
| 10 | MgO | 5 | 50 | E | 10 | EC | 25 | $C_{10}H_{17}OH$ | 230 |
| | CaO | 3 | 40 | C | 40 | | | | |
| | BaO | 5 | 10 | | | | | | |
| 11 | (Ba.Ca.Sr)O | 5 | 100 | C | 70 | EC | 27 | $C_{10}H_{17}OH$ | 210 |
| 12 | (Ba.Ca.Sr)O | 5 | 100 | E | 10 | EC | 25 | $C_{10}H_{17}OH$ | 230 |
| | | | | C | 40 | | | | |
| 13 | MgO | 5 | 100 | F | 70 | EC | 27 | $C_{10}H_{17}OH$ | 210 |
| 14 | MgO | 5 | 100 | G | 100 | EC | 30 | $C_{10}H_{17}OH$ | 180 |

(Remarks)
*[1]EC: ethylcellulose
*[2]$C_{10}H_{17}OH$: terpineol

EXAMPLE 15 AND COMPARATIVE EXAMPLE 1

A protective layer of a dielectric material was formed on one surface of a dielectric material layer of an alternating current type gas discharge panel by using the paste mainly comprising the composition for forming a protective layer of a dielectric material prepared in Example 3 (Example 15). A protective layer of a dielectric material comprising magnesium oxide was formed by a vacuum evaporation method (Comparative example 1). By using each protective layer of a dielectric material, a gas discharge panel was produced and a continuous discharge test was carried out to compare both protective layers.

As shown in FIG. 1 as a sectional view, a glass paste comprising lead borosilicate glass having a dielectric constant of 13 (at 1 kHz and 25° C.) and a softening point of 550° C. was subjected to screen-printing on a rear glass plate 2 equipped with electrodes 1 and 1' so as to cover said 1 and 1' with the paste, dried at 150° C. for 10 minutes and sintered at 580° C. for 10 minutes to form a dielectric material layer 3. Then, the paste prepared in Example 3 was subjected to screen-printing on the surface of 3, dried at 150° C. for 10 minutes and fired at 550° C. for 10 minutes to form a protective layer of a dielectric material 4. The protective layer had a thickness of 5 μm.

A protective layer of a dielectric material 4 comprising magnesium oxide and having a thickness of 0.5 μm was also formed by a vacuum evaporation method separately on the surface of another 3 prepared in the same manner as mentioned above.

Each of the materials was combined with a front glass plate 6 having a phosphor layer 5 on the surface of the glass to prepare a gas discharge panel, respectively. The gas discharge panel was loaded under an applied voltage of 130 V and a driving frequency of 50 kHz to carry out a continuous discharge, and changes in the discharge-maintaining voltage and in the intensity were observed.

As a result, the gas discharge panels using the protective layers of dielectric materials prepared in Example 13 and Comparative example showed the deviation of ±2 V based on the discharge-maintaining voltage of 90 V and the deviation of the intensity of ±0.02 as the relative value based on the initial value as 1, without a difference between the two panels.

EXAMPLES 16 TO 18 AND COMPARATIVE EXAMPLE 2

In the same manner as in Example 3 except for changing the binder precursor as shown in Table 3, respective pastes mainly comprising the composition for forming a protective layer of a dielectric material were prepared. By using each of these pastes, screen printing was carried out continuously and the number of times in which a homogeneous coating film can be obtained was examined. The results are shown in Table 3.

TABLE 3

| | Binder precursor | Number of times of printing |
|---|---|---|
| Example 16 | E + C* | 30 |
| Example 17 | C | 100 |

TABLE 3-continued

| | Binder precursor | Number of times of printing |
|---|---|---|
| Example 18 | D | 100 |
| Comparative example 2 | E | 2 |

*E:C = 1:1 (weight ratio)

As clearly seen from the above results, it can be understood that the samples of the present invention are excellent in stability (continuous printing property).

We claim:

1. A composition for forming a protective layer on a dielectric material which comprises:
   (A) alkaline earth metal oxide particles; and
   (B) one or more organic compounds containing aluminum, silicon, titanium or zirconium and represented by the following formula (I):

$$M^1(OR^1)_n \quad (I)$$

wherein $M^1$ represents aluminum, silicon, titanium or zirconium; $R^1$ represents an alkyl group having 2 to 8 carbon atoms or an alkoxyalkyl group having 2 to 8 carbon atoms, a plural number of $R^1$'s may be the same or different from each other, provided that when $M^1$ is aluminum, titanium or zirconium, $OR^1$ may be an alkyl-acetoacetato group or an acetylacetonato group, or when $M^1$ is zirconium, $R^1$ may be a monovalent acyl group which may be substituted by an hydroxyl group; and n represents the valency of $M^1$,
   or a partially hydrolyzed or co-hydrolyzed condensate of the compounds.

2. The composition according to claim 1, wherein the formulation ratio of Component (A) and Component (B) is in the range of 50:50 to 99.5:0.5 in terms of the weight ratio of (A):(B') wherein the amount of (B) is calculated in terms of the weight of the metal oxide (B') of a binder phase formed by firing of (B).

3. The composition according to claim 2, wherein said formulation ratio of Component (A) and Component (B) is 70:30 to 99:1.

4. The composition according to claim 1, wherein an alkaline earth metal oxide of Component (A) is at least one selected from beryllium oxide, magnesium oxide, calcium oxide, strontium oxide, barium oxide and a complex oxide thereof.

5. The composition according to claim 1, wherein said alkaline earth metal oxide particles have an average particle size of 0.1 to 10 μm.

6. The composition according to claim 1, wherein said condensate has an average number of $M^1$ atoms of 3 to 15.

7. The composition according to claim 1, wherein $M^1$ is aluminum or titanium.

8. The composition according to claim 1, wherein $R^1$ is selected from ethyl, propyl, butyl, pentyl, hexyl, heptyl, octyl, methoxyethyl, ethoxyethyl and butoxyethyl groups.

9. The composition according to claim 1, wherein said organic compound containing aluminum, silicon, titanium or zirconium is selected from the group consisting of titanium tetraisopropoxide, titanium tetra-n-butoxide, titanium tetrakis(2-ethylhexyloxide), titanium tetrakis(methoxyethoxide), diisopropoxytitanium bis(acetylacetonate), aluminium triisopropoxide, diisopropoxyaluminium (ethylacetoacetate), aluminium tris(ethylacetoacetate), ethyl orthosilicate, propyl orthosilicate, (2-methoxyethyl) orthosilicate, a partially hydrolyzed or co-hydrolyzed condensate thereof, zirconium tetra-n-butoxide, zirconium caprylate and zirconium 2-ethylhexanoate.

10. A composition for forming a protective layer on a dielectric material which comprises:
    (A) alkaline earth metal oxide particles; and
    (B)
    (1) one or more organic compounds containing aluminum, silicon, titanium or zirconium and represented by the following formula (I):

$$M^1(OR^1)_n \quad (I)$$

wherein $M^1$ represents aluminum, silicon, titanium or zirconium; $R^1$ represents an alkyl group having 2 to 8 carbon atoms or an alkoxyalkyl group having 2 to 8 carbon atoms, a plural number of $R^1$'s may be the same or different from each other, provided that when $M^1$ is aluminum, titanium or zirconium, $OR^1$ may be an alkyl-acetoacetato group or an acetylacetonato group, or when $M^1$ is zirconium, $R^1$ may be a monovalent acyl group which may be substituted by an hydroxyl group; and n represents the valency of $M^1$,
    or a condensate obtained by partial hydrolysis or partial co-hydrolysis of the compound, and
    (2) one or more organic compounds containing alkaline earth metal represented by the formula:

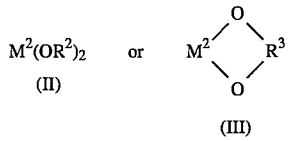

wherein $M^2$ represents an alkaline earth metal atom; $R^2$ may be the same or different from each other and represents a monovalent hydrocarbon group or a monovalent acyl group which may be substituted by a hydroxyl group; $R^3$ represents a divalent acyl group which may be substituted by a hydroxyl group.

11. The composition according to claim 10, wherein the formulation ratio of Component (A) and Component (B) is in the range of 50:50 to 99.5:0.5 in terms of the weight ratio of (A):(B') wherein the amount of (B) is calculated in terms of the weight of the metal oxide (B') of a binder phase formed by firing of (B) and Component (B) comprises a compound of formula (I) and at least one compound selected from the group consisting of formula (II) and formula (III).

12. The composition according to claim 11, wherein said formulation ratio of Component (A) and Component (B) is 70:30 to 99:1.

13. The composition according to claim 10, wherein an alkaline earth metal oxide of Component (A) is at least one selected from beryllium oxide, magnesium oxide, calcium oxide, strontium oxide, barium oxide and a complex oxide thereof.

14. The composition according to claim 10, wherein said alkaline earth metal oxide particles have an average particle size of 0.1 to 10 μm.

15. The composition according to claim 10, wherein said condensate has an average number of $M^1$ atoms of 3 to 15.

16. The composition according to claim 10, wherein $M^1$ is aluminum or titanium.

17. The composition according to claim 10, wherein said organic compound containing aluminum, silicon, titanium or zirconium is selected from the group consisting of titanium tetraisopropoxide, titanium tetra-n-butoxide, titanium tetrakis(2-ethylhexyloxide), titanium tetrakis(methoxyethoxide), diisopropoxytitanium bis(acetylacetonate), aluminium triisopropoxide, diisopropoxyaluminium (ethylacetoacetate), aluminium tris(ethylacetoacetate), ethyl orthoslicate, propyl orthosilicate, (2-methoxyethyl) orthosilicate, a partially hydrolyzed or co-hydrolyzed condensate thereof, zirconium tetra-n-butoxide, zirconium caprylate and zirconium 2-ethylhexanoate.

18. The composition according to claim 10, wherein $M^2$ is selected from beryllium, magnesium, calcium, strontium and barium.

19. The composition according to claim 10, wherein $M^2$ is magnesium.

20. The composition according to claim 10, wherein $R^2$ represents an alkyl group having 1 to 6 carbon atoms; an aliphatic acyl group having 2 to 12 carbon atoms; or an aromatic acyl group having 7 to 12 carbon atoms.

21. The composition according to claim 10, wherein $R^2$ is selected from the group consisting of methyl, ethyl, propyl, butyl, heptanoyl, octanoyl, benzoyl and butylbenzoyl groups.

22. The composition according to claim 10, wherein $R^3$ is selected from the group consisting of oxalyl, malonyl, succinyl, adipoyl and hydroxysuccinyl groups.

23. The composition according to claim 10, wherein said organic compound containing an alkaline earth metal is selected from the group consisting of magnesium dimethoxide, magnesium diethoxide, magnesium diisopropoxide, magnesium dibutoxide, magnesium formate, magnesium acetate, magnesium propionate, magnesium butyrate, magnesium caproate, magnesium 2-ethylhexanonate, magnesium laurate, magnesium stearate, magnesium methacrylate, magnesium oleate, magnesium naphthenate, magnesium benzoate, magnesium p-butylbenzoate, magnesium lactate, magnesium adipate; and corresponding beryllium compounds, calcium compounds, strontium compounds and barium compounds.

24. The composition according to claim 10, wherein said organic compound containing an alkaline earth metal is selected from the group consisting of magnesium ethoxide, magnesium isopropoxide, magnesium caprylate and magnesium 2-ethylhexanoate.

25. The composition according to claim 10, wherein Component (B) contains said organic compound containing an alkaline earth metal in an amount of 1 to 50% by weight.

26. The composition according to claim 10, wherein Component (B) contains said organic compound containing an alkaline earth metal in an amount of 10 to 30% by weight.

* * * * *